United States Patent [19]

Birgmeir

[11] Patent Number: 4,841,360
[45] Date of Patent: Jun. 20, 1989

[54] APPARATUS AND METHOD FOR THE REPRODUCTION OF COLORED ORIGINALS WITH GRAY BALANCE AND/OR CONTRAST ADJUSTMENT

[75] Inventor: Klaus Birgmeir, Putzbrunn, Fed. Rep. of Germany

[73] Assignee: Agfa - Gevaert Aktiengesellschaft, Leverkusen, Fed. Rep. of Germany

[21] Appl. No.: 85,943

[22] Filed: Aug. 14, 1987

[30] Foreign Application Priority Data

Aug. 29, 1986 [DE] Fed. Rep. of Germany ....... 3629422

[51] Int. Cl.⁴ .......................... G03F 3/08; H04N 1/40; H04N 1/46; H04N 9/64
[52] U.S. Cl. ......................................... 358/80; 358/37; 358/75; 358/166; 358/280; 358/284
[58] Field of Search ....................... 358/75, 80, 27, 28, 358/29, 29 C, 36, 37, 39, 40, 76, 78, 166, 167, 280, 284

[56] References Cited

U.S. PATENT DOCUMENTS

| | | | |
|---|---|---|---|
| 4,568,967 | 2/1986 | Freyberger et al. | 358/27 |
| 4,626,903 | 12/1986 | Giesche et al. | 358/80 |
| 4,636,845 | 1/1987 | Alkofer | 358/75 |
| 4,661,843 | 4/1987 | Sekizawa et al. | 358/80 |
| 4,706,131 | 11/1987 | Perten et al. | 358/280 |
| 4,729,016 | 3/1988 | Alkofer | 358/80 |
| 4,731,662 | 3/1988 | Udagawa et al. | 358/80 |
| 4,731,671 | 3/1988 | Alkofer | 358/284 |

FOREIGN PATENT DOCUMENTS

| | | | |
|---|---|---|---|
| 0123701 | 11/1984 | European Pat. Off. | |
| 0168818 | 1/1986 | European Pat. Off. | |
| 60-20694 | 2/1985 | Japan | 358/80 |
| 86/03887 | 5/1986 | PCT Int'l Appl. | 358/27 |

OTHER PUBLICATIONS

K. Y. Wong, "Adaptive Contrast Ranging For Images", *IBM Technical Disclosure Bulletin*, vol. 18, No. 3, Aug. 1975, pp. 914-917.

Primary Examiner—Edward L. Coles, Sr.
Assistant Examiner—Randall S. Svihla
Attorney, Agent, or Firm—Peter K. Kontler

[57] ABSTRACT

A colored original to be copied is scanned point-by-point in each of the three primary colors red, green and blue. A series of imaging signals is generated for each primary based color on the scanning operation. The signals are subsequently converted into a colored optical image of the original by means of a cathode ray tube which prints the image on color copy material. Prior to conversion, the signals are processed to electronically enhance the image. Following electronic image enhancement, the signals are adjusted to the characteristics of the copy material. The adjusted signals are now modified so as to make them proportional to the illumination intensity of the cathode ray tube or to the logarithm of the illumination intensity. The modified signals are next corrected to adjust the gray balance and/or the contrast of the image. This is accomplished either by multiplying each series of modified signals with a respective correction factor or adding a respective correction factor to each series of modified signals. The signals are thereafter fitted to the characteristic function of the cathode ray tube which then prints the image.

31 Claims, 6 Drawing Sheets

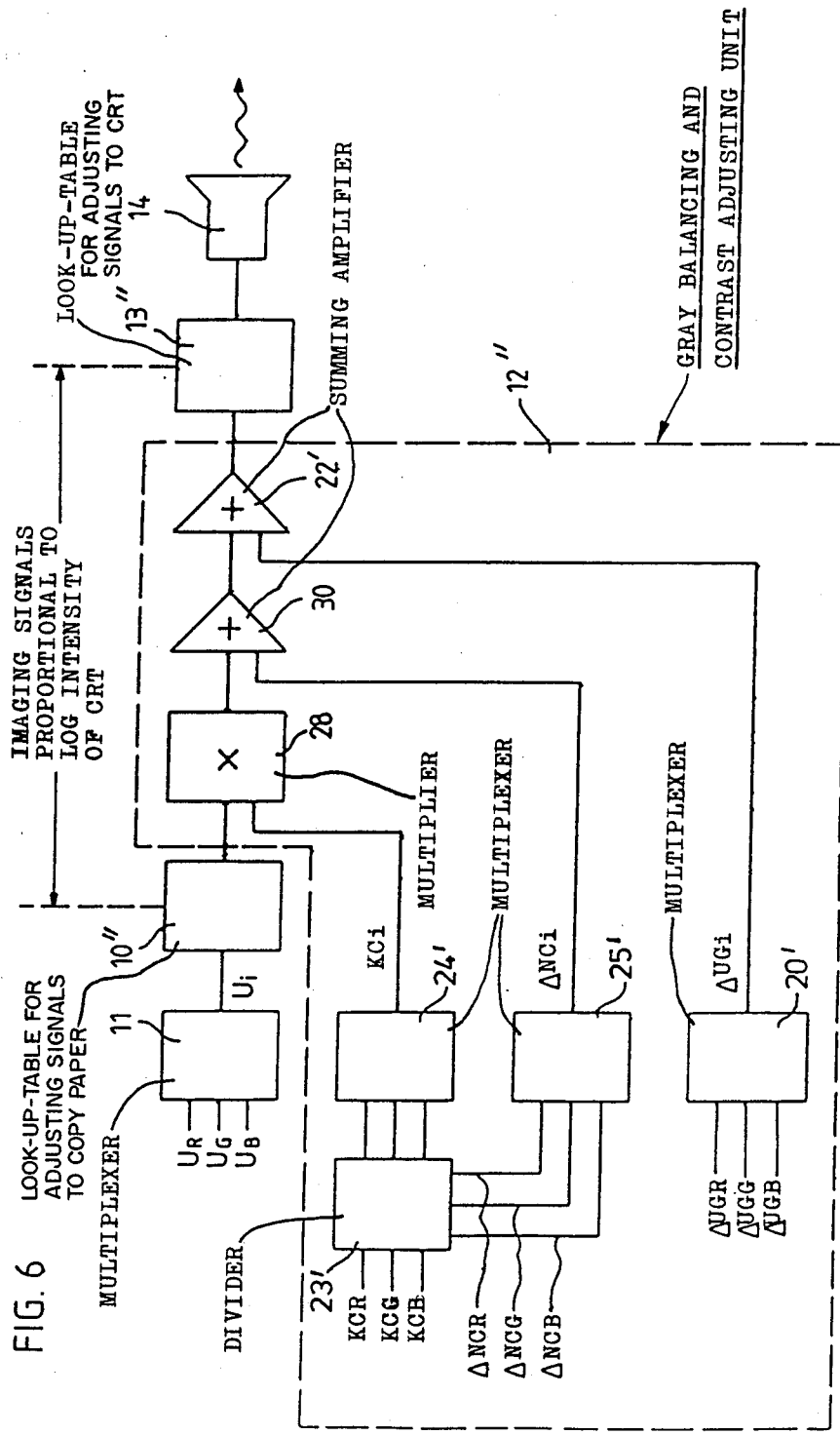

APPARATUS AND METHOD FOR THE REPRODUCTION OF COLORED ORIGINALS WITH GRAY BALANCE AND/OR CONTRAST ADJUSTMENT

BACKGROUND OF THE INVENTION

The invention relates generally to a copying method and apparatus.

More particularly, the invention relates to a copying method and apparatus in which the an original, especially a colored original, is scanned to generate imaging signals which are then processed to improve the quality of an image of the original.

In a known procedure for copying an original, the original is scanned along rows and columns, or point-by-point, to generate a set of imaging signals which represent an image of the original. The signals are processed in order to ensure that the tones of the image properly reflect those of the original. The processed signals are sent to a cathode ray tube which prints the image on color copy material by rows and columns or point-by-point. Signals may also undergo processing to adjust exposure parameters of the image such as gray balance and contrast. The processed signals are sent to a cathode ray tube which prints the image on color copy material by rows and columns or point-by-point.

Electronic image processing is being increasingly used in the reproduction of colored originals (positive-positive) and the production of colored photographic positives from color negatives. See, for example, the European Patent Application Nos. 123 701 and 168 818. Here, the original to be copied is electrooptically scanned along rows and columns, or point-by-point, and the resulting imaging signals are modified in accordance with specific criteria. As a rule, the imaging signals defining the image of the original are digitized, and the imaging signals may then be stored in digital memories. Scanning of the original is normally performed serially in the three primary colors red, green and blue (RGB).

The imaging signals are converted into optical images on copy material using printers with cathode ray tubes, also known as CRT printers. See, for instance, Journal of Imaging Technology, 12, No. 3 (June 1986), pp. 135-139. A problem with such apparatus is that the image processing operation generates imaging signals which are optimized in a specific manner, as regards color reproduction and contrast or sharpness, for the electronic reproduction of the image. In order that such signals may yield a properly colored copy having proper contrast when used to expose a color copy material via a cathode ray tube, the characteristics of the color copy material in relation to sensitivity and gradation, as well as the characteristics of the cathode ray tube, must be correctly taken into account.

Adjustment of the imaging signals to the non-linear characteristic function or line of the cathode ray tube is accomplished by means of a suitable amplifier disposed immediately before the cathode ray tube so that the characteristic function of the tube does not affect the gray balance and contrast. The characteristic blackening or darkening functions of the copy material are likewise nonlinear. Due to this non-linearity, changes in the amounts of light for the purpose of gray compensation influence the contrast of the tube, and vice versa. This interaction of adjustments makes it difficult and tedious to achieve the proper settings for gray balance and contrast using test copies because an iteration process which, under favorable circumstances, reduces the magnitudes of errors, is required.

OBJECTS AND SUMMARY OF THE INVENTION

It is an object of the invention to provide a copying method which makes it possible to simplify the setting of exposure parameters, e.g., gray balance and contrast.

Another object of the invention is to provide a copying method which makes it possible to properly set exposure parameters relatively rapidly.

A further object of the invention is to provide a copying method which makes it possible to set two exposure parameters substantially independently of one another.

An additional object of the invention is to provide a copying method which makes it possible to obtain quantitatively correct settings of exposure parameters from test copies without frequent repetitions.

It is also an object of the invention to provide a copying apparatus which enables the setting of exposure parameters such as gray balance and contrast to be simplified.

Yet another object of the invention is to provide a copying apparatus which allows exposure parameters to be properly set relatively rapidly.

A concomitant object of the invention is to provide a copying apparatus which permits two exposure parameters to be set substantially independently of one another.

One more object of the invention is to provide a copying apparatus which enables quantitatively correct settings of exposure parameters to be obtained from test copies without frequent repetitions.

The preceding objects, as well as others which will become apparent as the description proceeds, are achieved by the invention.

One aspect of the invention resides in a method of making an optical image of an original, e.g., a colored positive or negative, using an imaging device such as, for example, a cathode ray tube. The method comprises the steps of scanning the original, and generating imaging signals based on the scanning step. The method further comprises the step of adjusting a predetermined one of a plurality of exposure parameters for the image, e.g., gray balance and contrast, in such a manner that each remaining exposure parameter of the plurality is substantially unaffected. The adjusting step includes modifying the imaging signals so that the latter are substantially proportional to a predetermined characteristic, e.g., the illumination intensity, of the imaging device or to the logarithm of the predetermined characteristic. Preferably, the modified signals encompass an exposure range corresponding to the normal exposure range. The adjusting step also includes correcting the signals subsequent to modification, and the correction involves multiplying the signals by a correction factor for the predetermined exposure parameter or adding a correction factor for the predetermined exposure parameter to the signals. The correction may, for instance, function to correct the illumination intensity of the imaging device as necessary to adjust the predetermined exposure parameter. The signals are converted into the optical image after the adjusting step.

The scanning step, as well as the converting step, may be performed along rows and columns, or point-by-point.

The signals are advantageously subjected to image processing prior to the adjusting step in order to enhance the image, e.g., in order to improve color saturation and sharpness in the case of a colored image.

In the reproduction of a colored original, the scanning step is performed in each of the three primary colors red, green and blue. Three series of imaging signals, each corresponding to a different primary color, are then generated. Correction of the signals may here involve multiplying the signals of each series by a correction factor for the respective primary color or adding a correction factor for the respective primary color to the signals of each series. Conversion of the signals may comprise printing the image of the original on radiation-sensitive color copy material or paper.

Another aspect of the invention resides in a copying apparatus comprising means for scanning an original and generating imaging signals, and means, e.g., a cathode ray tube, for converting the imaging signals into an optical image. The apparatus further comprises means between the scanning means and the converting means for adjusting at least one predetermined exposure parameter of the image, e.g., the gray balance or contrast. The adjusting means includes a first unit such as, for example, a Look-Up-Table, for modifying the imaging signals so as to be substantially proportional to a predetermined characteristic, e.g., the illumination intensity, of the converting means or to the logarithm of the predetermined characteristic. The adjusting means also includes a second unit for correcting the signals subsequent to modification by adding a correction factor for the predetermined exposure parameter to the signals or multiplying the signals by a correction factor for the predetermined exposure parameter.

The scanning means may be designed to scan the original and generate imaging signals along rows and columns, or point-by-point. The converting means may then similarly be designed to convert the imaging signals into the optical image by rows and columns, or point-by-point.

The original may be colored, e.g., may be in the form of a colored positive or a colored negative, and the apparatus may be provided with color copy material or paper which enables a colored image of the original to be produced. The converting means is here designed to form a colored image of the original on the copy material, and the adjusting means is advantageously arranged to adjust the signals to the characteristics of the copy material.

The color copy material may be designed to absorb radiation in three primary absorption ranges. However, absorption of radiation will normally not be restricted to these ranges and the copy material will tend to absorb radiation outside of the same. In order to reduce errors which may arise from this tendency, the apparatus may additionally comprise color matrixing means between the scanning means and the adjusting means to compensate for the tendency of the copy material to absorb radiation outside of the primary absorption ranges. The apparatus may also include means between the scanning means and the adjusting means for processing the signals so as to enhance the image, e.g., so as to improve color saturation and sharpness.

The converting means may be designed in accordance with a characteristic function and the apparatus may be provided with means for fitting the imaging signals to such function The fitting means is preferably disposed between the adjusting means and the converting means.

When the apparatus is intended for the reproduction of colored originals, the scanning means may be arranged to scan an original in each of the three primary colors red, green and blue and to generate three series of imaging signals each of which corresponds to a different primary color. The second or correcting unit may then be designed to add a correction factor for the respective primary color to the signals of each series or to multiply the signals of each series by a correction factor for the respective primary color.

The modified signals issuing from the first or modifying unit advantageously cover a range of exposures corresponding to the normal exposure range.

The creation of a set of signals which encompass the normal exposure range and are proportional to a predetermined characteristic, or the logarithm of a predetermined characteristic, such as the illumination intensity or brightness, of the imaging device or cathode ray tube makes it possible to apply correction factors or adjustment values to the imaging signals in such a manner that a change in gray balance, for example, may be accomplished without an accompanying change in contrast, and vice versa. The correct gray balance is obtained when a gray area on the original appears gray on the copy. From a densitometric point of view, the densities of the different primary color components are equal or approximately equal.

The novel features which are considered as characteristic of the invention are set forth in particular in the appended claims. The improved copying method and apparatus, however, together with additional features and advantages thereof, will be best understood upon perusal of the following detailed description of certain specific embodiments with reference to the accompanying drawings.

BRIEF DESCRIPTION OF THE DRAWINGS

FIG. 6 is a block diagram showing details of a fourth embodiment of the printer.

DESCRIPTION OF THE PREFERRED EMBODIMENTS

Figure 1:
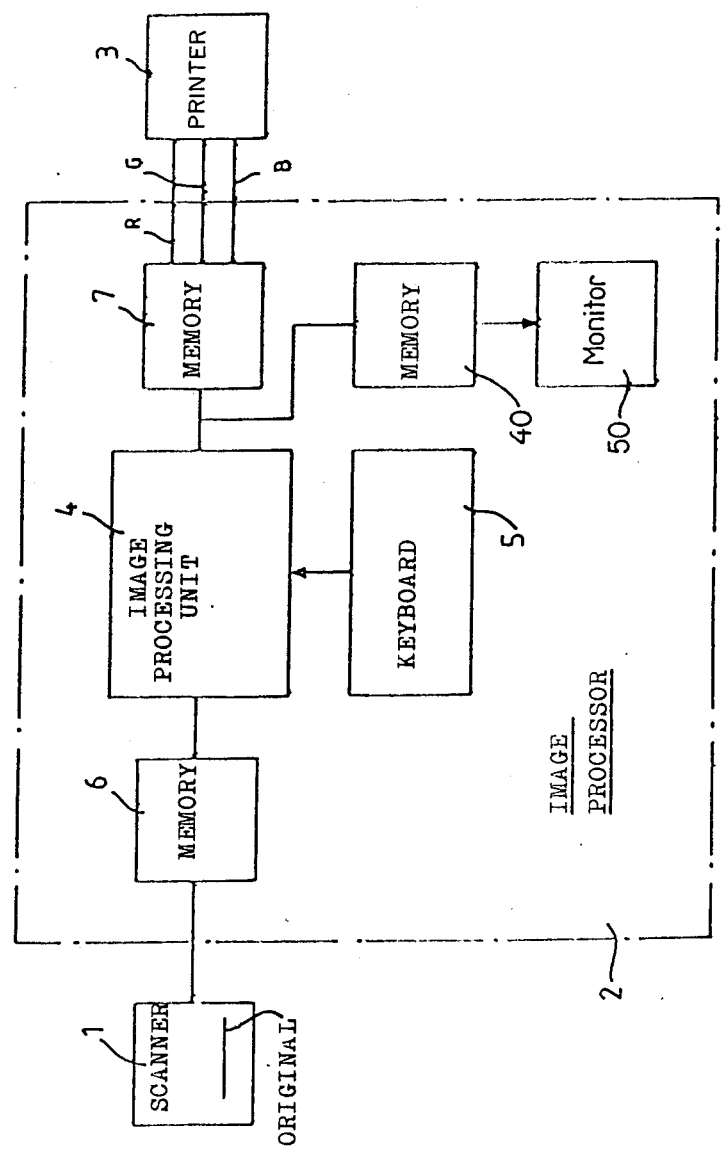
FIG. 1 is a block diagram of a copying apparatus according to the invention.

FIG. 1 shows a copying apparatus designed for the reproduction of a colored original such as a color positive or color negative. The apparatus includes a scanner 1 which is arranged to electrooptically scan the original along rows and columns. To this end, the scanner 1 comprises a horizontally oriented, linear CCD (charge-coupled device) sensor which is movable vertically across the original. The sensor scans the original consecutively in the three primary colors red, green and blue (RGB). This is accomplished by pivoting appropriate color filters into the optical path between the sensor and the original. The sensor scans the original along 1024 rows and at 2048 points per row, i.e., scans the original point-by-point, so that the original and its image are divided into 2048×1024 image elements (pixels) in each of the three primary colors. The scanner 1 generates electrical imaging signals for each point and primary color. A conventional, non-illustrated correction circuit eliminates CCD-specific errors, e.g., dark currents and differing sensitivities of the CCD elements. The corrected imaging signals issuing from the correction circuit are next digitized. Subsequently, the imaging signals are subjected to electronic image processing in an image processor identified generally by the reference numeral 2 and delineated by a dash-and-dot line. From the image processor 2, the imaging signals are sent to a printer 3 which is described in more detail below. The printer 3, which contains an imaging device in the form of a cathode ray tube, converts the electrical imaging signals into an optical image which is then printed on photographic copy material, e.g., color negative paper. It is to be noted that the printer 3 converts the electrical imaging signals in such a manner that the optical image is built up point-by-point. Thus, in principle, each pixel can undergo image processing and thereafter be printed on the copy material at a location corresponding to the coordinates of the pixel on the original.

The image processor 2 comprises an image processing unit 4 in which the actual electronic image processing of the imaging signals takes place. The image processing unit 4 may be externally regulated via a keyboard 5. A first memory 6 is disposed in front of the image processing unit 4 while a second memory 7 is located behind the unit 4. The memories 6,7, which function to store the imaging signals, make it possible for the printer 3 to recall and print a first image stored in the memory 7 while, at the same time, a second image is being introduced into the memory 6 and processed by the unit 4. The three basic operations of scanning by the scanner 1, image processing by the unit 4 and printing by the printer 3 may thus be separated from, or made independent of, one another. An image which has been processed by the unit 4 and is ready to be printed may be stored in a third memory 40 for viewing on a monitor 50. The monitor 50 and its associated memory 40 are included in the image processor 2 since an operator assigned to evaluate the processed images on the monitor 50 prior to printing can make any additional corrections, e.g., in color and brightness, which may be necessary via the keyboard 5.

Once processing of the image in the image processor 2 has been completed, the memory 7 contains a series of imaging signals for each of the three primary color components. These signals have been optimized as regards color saturation and image contrast or sharpness of contours.

Figure 2:
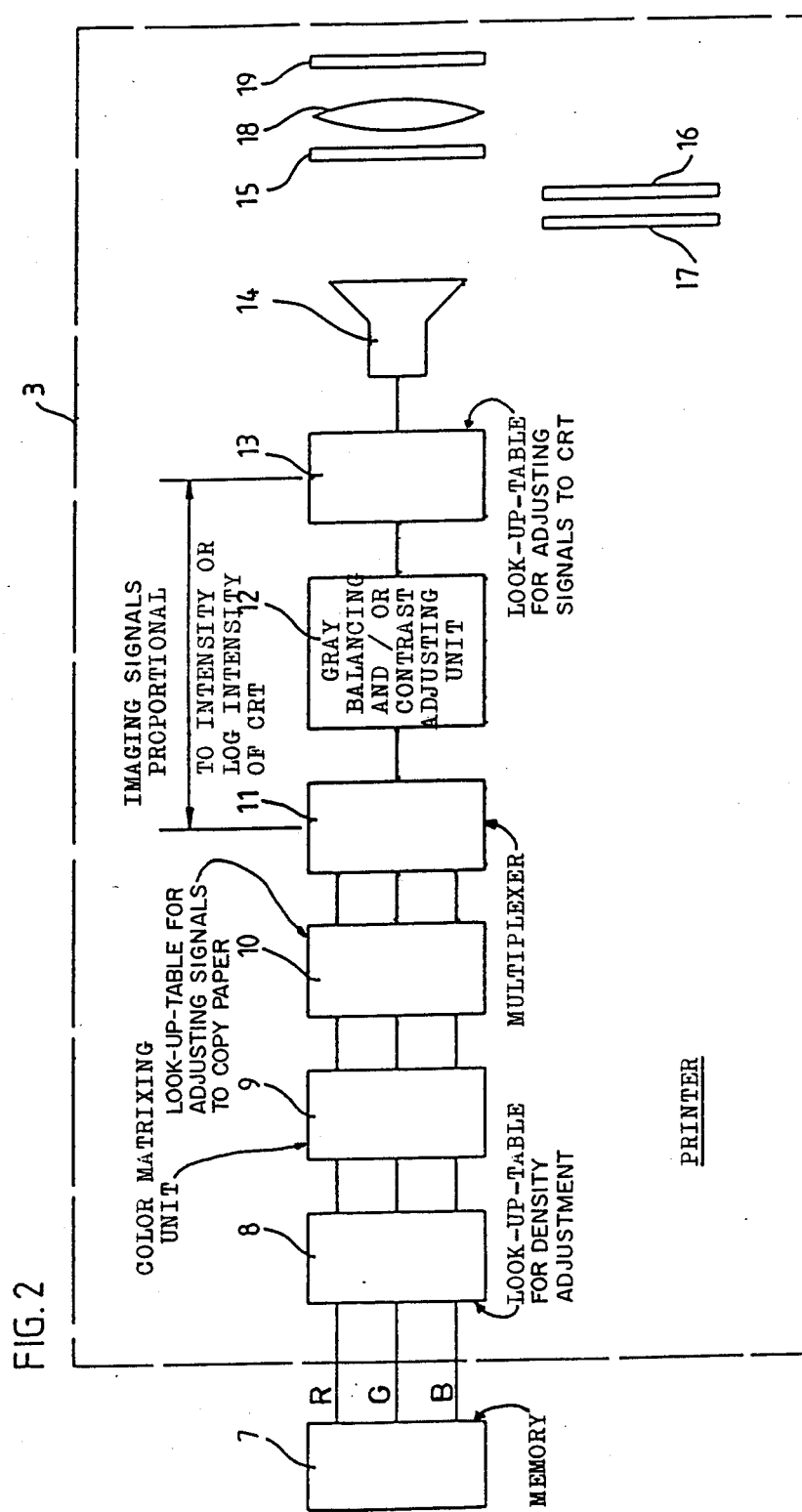
FIG. 2 is a block diagram showing the overall construction of a printer constituting part of the apparatus of FIG. 1.

The basic components of the printer 3 are shown in FIG. 2. As shown, the memory 7 has three outputs each corresponding to one of the primary colors, and a Look-Up-Table 8 is connected to these outputs. The Look-Up-Table 8 has a channel for each primary color and every signal entering such a color channel from the memory 7 is associated with a specific corrected signal via a characteristic function or line. The correction undergone by the imaging signals in the Look-Up-Table 8 compensates for the difference between the desired densities loaded into the input of the system and the print densities required when taking into account the gloss of the photographic paper.

A color matrixing unit 9 is connected with the three channels of the Look-Up-Table 8. The matrixing unit 9 is constituted by a multiplying amplifier with nine independent coefficients designed to take into consideration the subordinate densities of the photographic copy material. For instance, the desired values for red, green and blue may each be obtained by multiplying the density values at the outputs of the Look-Up-Table 8 with three coefficients and summing the results. In other words, considering the red channel by way of example, not only is the desired red density value issuing from the Look-Up-Table 8 taken into account but also the desired density values for the green and blue color components. However, in the red channel, the coefficients for the green and blue color components are appropriately reduced. The color matrixing unit 9 is intended to take into consideration the fact that, aside from absorbing radiation in the three primary color ranges red, green and blue, the dyes used in color copy materials exhibit undesired subordinate absorptions—so-called subordinate densities—in adjoining color ranges.

Following the color matrixing unit 9 is a second Look-Up-Table 10 having three inputs and three outputs. The Look-Up-Table 10 functions to compensate for the characteristic darkening or blackening function of the copy paper, and the modified signals issuing from the outputs of the Look-Up-Table 10 are proportional to, or proportional to the logarithm of, a predetermined characteristic of a cathode ray tube 14 forming part of the printer 3. The cathode ray tube 14 constitutes an imaging device which serves to convert the electrical imaging signals into an optical image, and the predetermined characteristic of the cathode ray tube 14 is here the brightness or illumination intensity of the latter. The modified signals emitted by the Look-Up-Table 10 cover a range of exposures corresponding to the normal exposure range. A multiplexer 11 is disposed behind the Look-Up-Table 10 and transmits the signals from that output of the Look-Up-Table 10 corresponding to the color component currently being used for exposure of the copy material to a unit 12 serving for adjustment of at least one exposure parameter of the image. The unit 12, which is described in detail with reference to FIGS. 3-6, here functions to adjust the gray balance and/or the contrast of the image. The unit 12 has an output which is connected to a further Look-Up-Table 13 functioning to compensate for the non-linear characteristic function or line relating the input voltage of the cathode ray tube 14 to the brightness or intensity of the image formed on the screen of the tube 14. The optical image on the screen of the cathode ray tube 14 is printed on radiation-sensitive or light-sensitive copy material 19 through the agency of an objective 18 and three color filters 15,16,17 which can be selectively moved into and out of the optical path. Each of the filters 15,16,17 has a different one of the primary colors, and the copy material 19 is color copy material so that the image printed on the latter is a colored image.

The darkening function of the photographic copy material 19, as well as the characteristic function of the cathode ray tube 14, are non-linear. Consequently, when adjusting the gray balance and contrast to the darkening characteristics of the copy material 19, there exists the fundamental difficulty that, as a rule, it is not possible to adjust the gray balance without affecting the contrast, and vice versa. In the apparatus according to the invention, this difficulty is overcome by the Look-Up-Table 10 which creates a set of signals proportional to the illumination intensity E of the printing tube 14 or proportional to the logarithm of the illumination intensity E.

Figure 3:
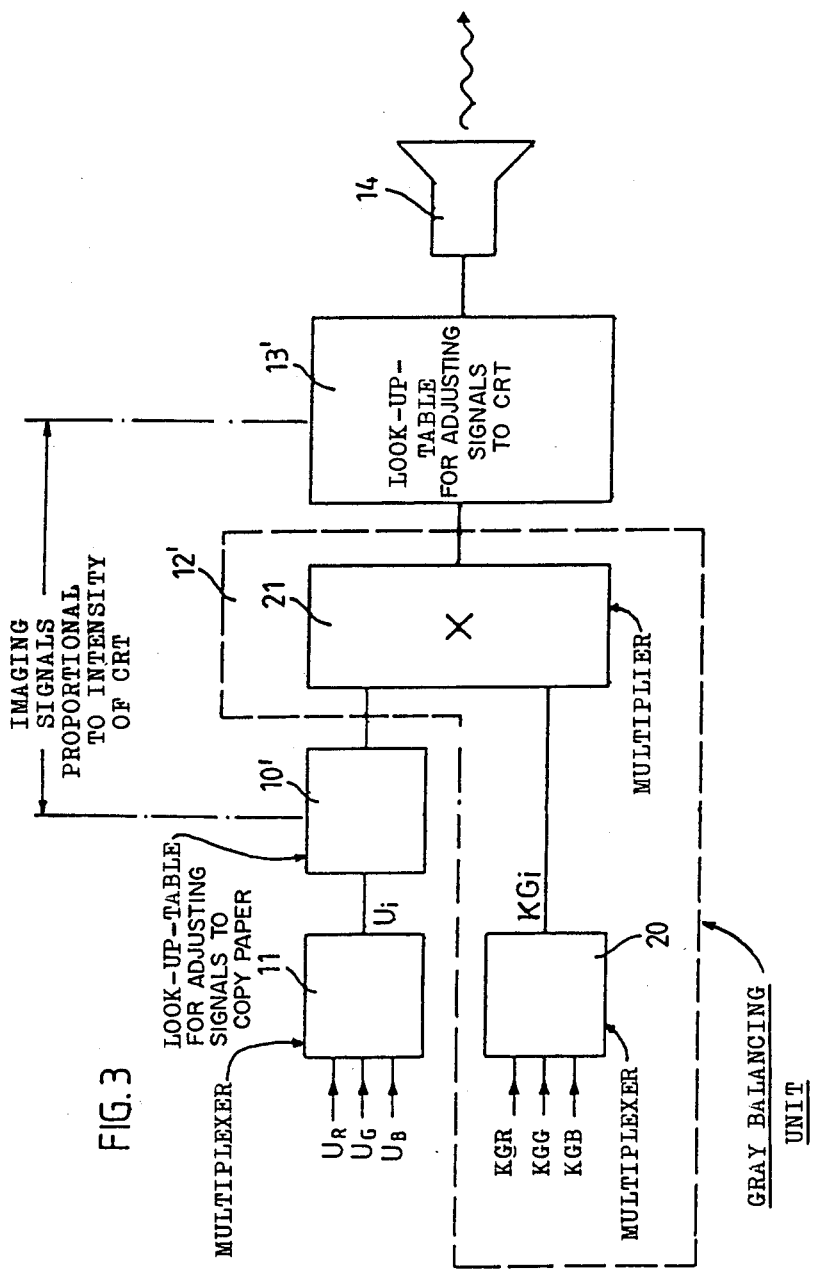
FIG. 3 is a block diagram illustrating details of a first embodiment of the printer.
Figure 4:
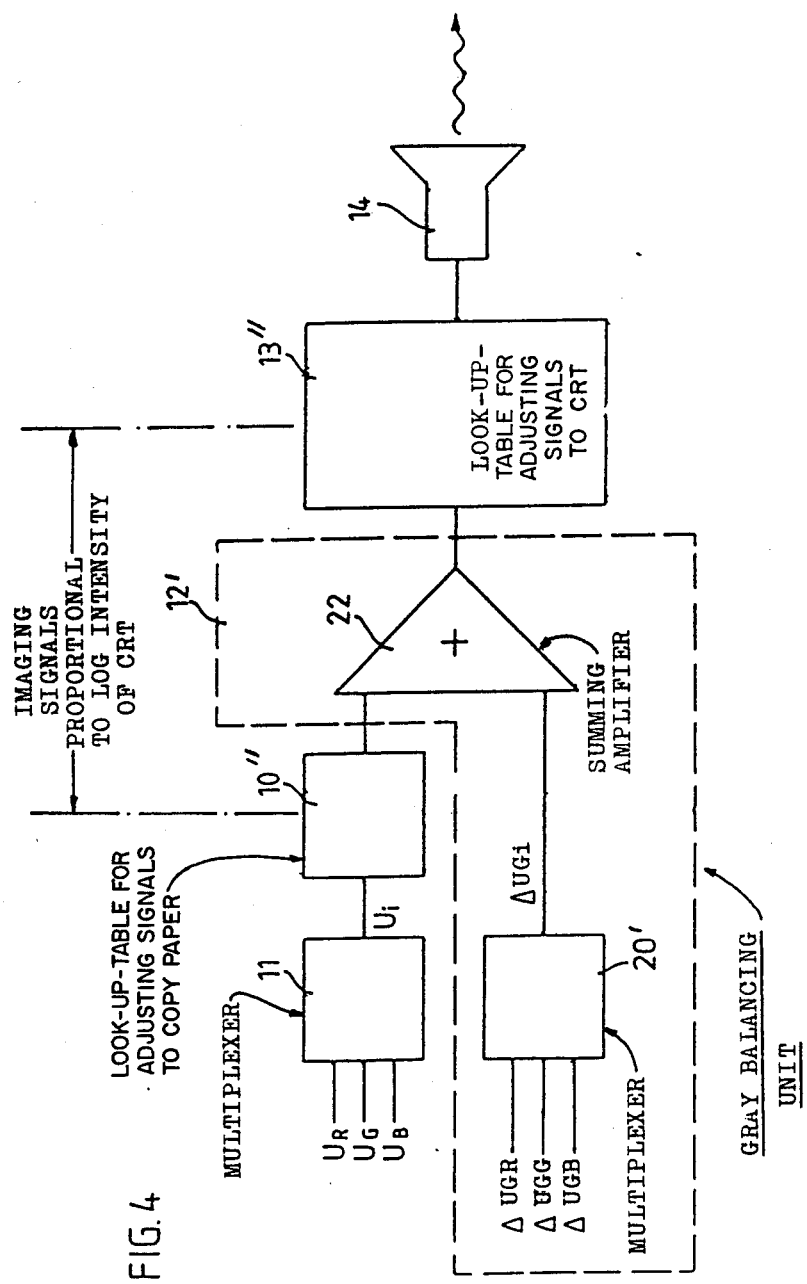
FIG. 4 is a block diagram showing details of a second embodiment of the printer.
Figure 5:
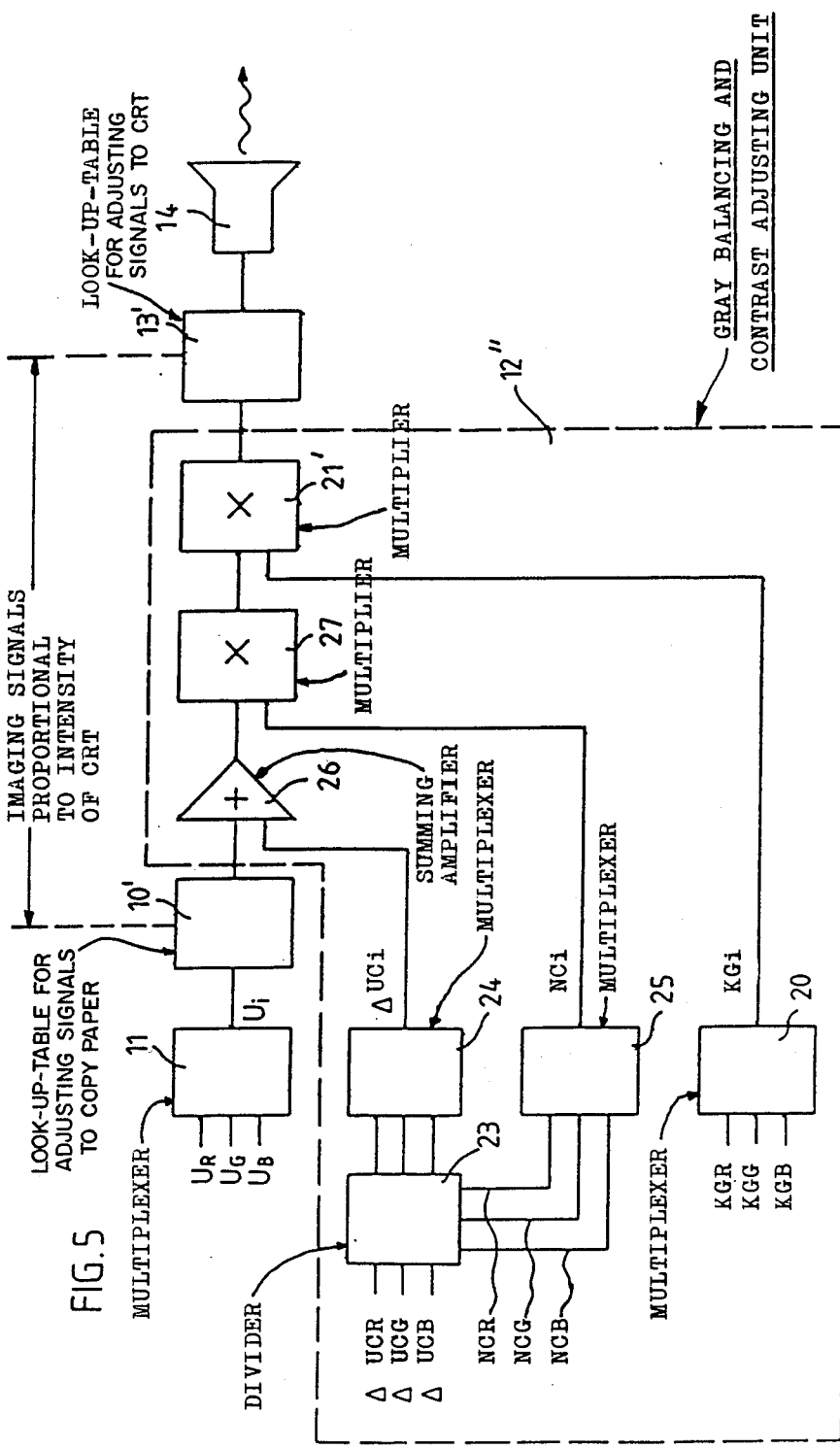
FIG. 5 is a block diagram illustrating details of a third embodiment of the printer.

FIGS. 3-6 illustrate different ways of adjusting one of the exposure parameters gray balance and contrast without affecting the other. FIGS. 3 and 4 show adjustment of gray balance alone while FIGS. 5 and 6 show adjustment of both contrast and gray balance. It is noted that it is further possible to adjust contrast alone.

Before describing FIGS. 3-6, it is observed that the Look-Up-Table 10 can, in principle, be disposed behind the multiplexer 11 in which case there is a common characteristic function or line for the three color channels. In other words, the components 10 and 11 of FIG. 2 can be interchanged with a resultant saving of two characteristic functions. Furthermore, the multiplexer 11 and the Look-Up-Table 10 can then be connected to one another by a single conductor.

FIG. 3 illustrates an arrangement in which the imaging signals are proportional to the illumination intensity E of the cathode ray tube 14. The multiplexer 11 receives signals UR, UG, UB from the preceding color matrixing unit 9. A single transmission channel connects the multiplexer 11 to the Look-Up-Table 10' which is here disposed behind the multiplexer 11 and contains the reciprocal of the characteristic darkening function of the copy material 19. The Look-Up-Table 10' modifies the incoming imaging signals Ui so that these are proportional to the illumination intensity E of the tube 14. The output signals of the Look-Up-Table 10' are sent to a first input of a multiplier or multiplying amplifier 21 constituting part of a gray balancing unit 12'. The gray balancing unit 12' further includes a non-illustrated, manually controllable signal generator which delivers gray balance correction signals or factors KGR,KGG,KGB to a multiplexer 20 likewise constituting part of the gray balancing unit 12'. The output signals KGi of the multiplexer 20 are sent to a second input of the multiplier 21. The latter multiplies the output signals of the Look-Up-Table 10 by the output signals of the multiplexer 20 thereby effecting correction of the illumination intensity of the cathode ray tube 14. Since correction f the illumination intensity is performed using signals which are proportional to the illumination intensity, multiplication of the imaging signals by the factors KGR,KGG,KGB has no effect on the set contrast value E(max)/E(min) contained in the image information. This may be seen from equation (1) below where E(max) is the upper limit of the screen brightness adjustment range of the cathode ray tube 14 and E(min) is the lower limit of the adjustment range:

$$\text{Contrast} = E(\max)/E(\min) = KGi \cdot E(\max)/KGi \cdot E(\min) \quad (1)$$

Since the correction factors KGi cancel, the general characteristic function is also not affected by correction of the illumination intensity as may be observed from the following equation (2):

$$E(\max)/E(\text{mid}) = KGi \cdot E(\max)/KGi \cdot E(\text{mid}) \quad (2)$$

where E(mid) represents the middle of the screen brightness adjustment range of the tube 14.

FIG. 4 shows another arrangement for adjusting the gray balance of the image. Here, the Look-Up-Table 10" modifies the imaging signals so that they are proportional to the logarithm of the illumination intensity E of the cathode ray tube 14 rather than to the illumination intensity E directly. The output signals of the Look-Up-Table 10" are sent to a summing amplifier 22 constituting part of the gray balancing unit 12'. The gray balancing unit 12' again includes a non-illustrated, manually operated signal generator for appropriate gray balance correction signals or factors $\Delta$UGR, $\Delta$UGG, $\Delta$UGB which are introduced into a multiplexer 20' also constituting part of the gray balancing unit 12'. The multiplexer 20' is connected to a second input of the summing amplifier 22 which adds the output signals $\Delta$UGi of the multiplexer 20' to the output signals log Ui of the Look-Up-Table 10". From a mathematical point of view, the output signals of the summing amplifier 22 are equivalent to the output signals of the multiplier 21 of FIG. 3. In the present case, also, addition of the gray balance correction signals $\Delta$UGi to the logarithmic signal log Ui does not change the contrast. This may be seen from the following equation (3) for the contrast in which the correction factors $10^{\Delta UGi}$ cancel:

$$\begin{array}{l}\log E(\max) + \Delta UGi \rightarrow \\ \log E(\min) + \Delta UGi \rightarrow\end{array} \frac{(10^{\Delta UGi}) \cdot E(\max)}{(10^{\Delta UGi}) \cdot E(\min)} = \frac{E(\max)}{E(\min)} \quad (3)$$

The Look-Up-Table 13" modifies the output signals of the summing amplifier 22 not only by the reciprocal of the characteristic function of the cathode ray tube 14 but, in addition, by an exponential function $\gamma^{-1}$. In contrast, the Look-Up-Table 13' of FIG. 3 contains only the reciprocal of the characteristic function of the tube 14.

The dynamic range of the signals and of the illumination intensity of the cathode ray tube 14 should exceed the exposure range of the image carrier in both the system of FIG. 3 and that of FIG. 4. The embodiments of the adjusting arrangement shown in FIGS. 3 and 4 allow the number of components to be reduced since they require only a single Look-Up-Table to compensate for the characteristic darkening function of the copy material.

FIGS. 5 and 6 illustrate arrangements for adjusting the contrast without changing the brightness of the image and for adjusting the gray balance. Components in FIGS. 5 and 6 corresponding to those of FIGS. 2-4 are identified by similar reference numerals.

Referring first to FIG. 5, the Look-Up-Table 10' arranged behind the multiplexer 11 again creates a set of signals proportional to the illumination intensity E of the cathode ray tube 14. The output signals of the Look-Up-Table 10' are delivered to a first input of a summing amplifier 26 constituting part of a unit 12" for adjusting gray balance and contrast. The unit 12" further includes a nonillustrated signal generator which functions to generate three adjustable contrast correction signals or factors $\Delta$UCR, $\Delta$UCG, $\Delta$UCB. The contrast correction signals $\Delta$UCR, $\Delta$UCG, $\Delta$UCB enter a dividing amplifier or divider 23 and, from there, are sent to a multiplexer 24. The output signals $\Delta$UCi of the multiplexer 24 are forwarded to a second input of the summing amplifier 26.

The divider 23 forms three contrast compensating signals or factors NCR,NCG,NCB from the contrast correction signals $\Delta$UCR, $\Delta$UCG, $\Delta$UCB and delivers such contrast compensating signals NCR,NCG,NCB to a multiplexer 25. The output signals NCi of the multiplexer 25 are forwarded to a first input of a multiplying amplifier or multiplier 27 having a second input connected to the output of the summing amplifier 26.

The divider 23; multiplexers 24,25; summing amplifier 26; and multiplier 27, which all function for contrast adjustment, constitute part of the gray balancing and contrast adjusting unit 12″.

In addition to contrast adjustment via the signals ΔUCR, ΔUCG, ΔUCB and NCR,NCG,NCB, it is here possible to adjust the gray balance as in FIG. 3. To this end, the gray balancing and contrast adjusting unit 12″ additionally includes a non-illustrated signal generator for the gray balance correction signals or factors KGR,KGG,KGB, as well as the multiplexer 20 of FIG. 3. The multiplexer 20 sends the gray balance correction signals KGR,KGG,KGB to a first input of a multiplying amplifier or multiplier 21′ in the proper time sequence. The multiplier 21′ has a second input connected to the output of the first multiplier 27, and an output connected to the Look-Up-Table 13′. The output signals of the Look-Up-Table 13′ control the cathode ray tube 14.

It is noted that the multiplexer 20 and multiplier 21′ again constitute part of the gray balancing and contrast adjusting unit 12″.

The output signals of the Look-Up-Table 10′ for each primary color component red, green, blue, which are proportional to the illumination intensity E of the cathode ray tube 14, are summed with the respective red, green and blue contrast correction signals ΔUCR, ΔUCG, ΔUCB in the summing amplifier 26. These sums are then multiplied by the respective red, green and blue contrast compensating signals NCR,NCG,NCB in the multiplier 27.

The new contrast obtained after contrast adjustment in the summing amplifier 26, which differs from the original contrast, is calculated as follows:

$$\text{Contrast(new)}i = \frac{E(\max) + \Delta UCi}{E(\min) + \Delta UCi} \neq \quad (4)$$

$$\frac{E(\max)}{E(\min)} = \text{Contrast(original)}i$$

The contrast compensating signal NCi used for the subsequent multiplication in the multiplier 27 is defined as follows:

$$NCi = \frac{\tilde{E}}{E + \Delta UCi} \quad (\tilde{E} \epsilon [E(\min), E(\max)]) \quad (5)$$

The parameter $\tilde{E}$, which is freely selectable between E(min) and E(max), is that intensity value which remains constant in the three channels during the change in contrast. It may, for example, be set at an average intensity for which a density of 1.0 is obtained. The reference intensity $\tilde{E}$, e.g., that intensity for which a density of 1.0 is produced in the copy material or paper, is then given by:

$$\tilde{E} = NCi \cdot (E + \Delta UCi) \quad (6)$$

The correction and compensating factors are to be set in such a manner that the reference intensity remains unchanged during contrast adjustment. The parameter $\tilde{E}$ is freely selectable and can be fitted to the characteristics of the image carrier. Calculation of the correction and compensating factors can be suitably performed via a microprocessor system using the preceding equations.

In a simplified mode of operation according to the invention, contrast adjustment is performed without the contrast compensating signal NCi. This is possible when only small changes are to be carried out during contrast adjustment with the correction factor ΔUCi.

Incorporation of the components 20 and 21′ in the gray balancing and contrast adjusting unit 12″ allows both contrast adjustment and adjustment of the gray balance to be performed in the same device. Furthermore, for reasons of economy, the two multipliers 27 and 21′ which are here arranged one behind the other, may be combined.

In the embodiment of FIG. 6, the Look-Up-Table 10″ modifies the imaging signals so that these are proportional to log E, that is, the logarithm of the illumination intensity E of the cathode ray tube 14. The output signals of the Look-Up-Table 10″ are sent to a first input of a multiplying amplifier or multiplier 28 constituting part of the gray balancing and contrast adjusting unit 12″. The unit 12″ here further includes a non-illustrated signal generator for contrast correction signals or factors KCR,KCG,KCB. The contrast correction signals KCR,KCG,KCB are fed into a divider 23′ and, from there, travel to a multiplexer 24′. The output signals KCi of the multiplexer 24′ are delivered to a second input of the multiplier 28.

The divider 23′ forms contrast compensating signals or factors ΔNCR, ΔNCG, ΔNCB from the contrast correction signals KCR,KCG,KCB and sends such contrast compensating signals ΔNCR, ΔNCG, ΔNCB to a multiplexer 25′. The output signals ΔNCi of the multiplexer 25′ are forwarded to a first input of a summing amplifier 30 having a second input which is connected to the output of the multiplier 28.

The divider 23′; multiplexers 24′,25′; multiplier 28; and summing amplifier 30, all of which constitute part of the gray balancing and contrast adjusting unit 12″, function to carry out a contrast adjustment when the imaging signals are made proportional to the logarithm of the illumination intensity E of the cathode ray tube 14.

In addition to the components for contrast adjustment, the unit 12″ contains components for adjustment of the gray balance. These components include a non-illustrated signal generator for the gray balance correction signals or factors ΔUGR, ΔUGG, ΔUGB, and the multiplexer 20′ of FIG. 4 which is arranged to receive the gray balance correction signals ΔUGR, ΔUGG, ΔUGB. The output signals ΔUGi of the multiplexer 20′ are delivered to a first input of a summing amplifier 22′ disposed behind the summing amplifier 30 and having a second input which is connected to the output of the amplifier 30. The Look-Up-Table 13″ for taking account of the characteristic function of the cathode ray tube 14 is connected to the output of the summing amplifier 22′ and the cathode ray tube 14 itself, in turn, is connected to the output of the Look-Up-Table 13″. Beginning with equation (7), the arrangement of FIG. 6 mathematically effects the following changes in the imaging signals:

$$Ui \sim KCi \cdot \log Ei \quad (7)$$

In order to compensate for the change intensity, the contrast compensating signal ΔNCi is added in accordance with equation (8):

$$\Delta NCi = (KCi - 1) \log \tilde{E} \quad (8)$$

Ui can then be written as follows:

$$Ui = KCi \cdot \log Ei - \Delta NCi \tag{8a}$$

The reference intensity thus results the same value for Ui as with the uncorrected signals. The original contrast which, per equation (9), is given by Contrast(original) = E(max)/E(min) changes as shown by equation (10): (9)

$$\text{Contrast(new)} = [\text{Contrast(original)}] \cdot KCi \tag{10}$$

Accordingly, the intensity ratio E(max)/E(mid) changes in the same proportion as [E(max)/E(mid)]·KCi.

This represents a density gradation of equal steps. Taken in combination with the gray balance adjustment according to FIG. 6, there is obtained a particularly versatile and economical separation of the exposure parameters, namely, contrast and gray balance, from one another. The two summing amplifiers 30 and 22' of FIG. 6 may be combined similarly to the multipliers 27 and 21' of FIG. 5.

There are copy materials which exhibit an imbalance, that is, different slopes of the characteristic darkening functions for the different primary colors. Moreover, the slopes can change in dependence upon the density. These properties may be taken into account by means of appropriate comparing amplifiers which, in addition to adjustment of the contrast independently of the gray balance, make it possible to compensate for the imbalance of the copy material independently of the gray balance. If, for instance, the change in slope of the characteristic darkening function occurs beyond the base value $\log \hat{E}$, that is, at values which satisfy the relation $$\log Ei - \log \hat{E}i > 0, \tag{11}$$

then the term on the left-hand side of equation (11) is to be multiplied by the correction factor Ki2 to obtain the expression:

$$Ki2 \cdot (\log Ei - \log \hat{E}i).$$

Upon adding this expression to the corrected value of Ui given by equation (8a), there is obtained a new corrected output signal per equation (12) which compensates for the imbalance of the copy material:

$$Ui = [KCi \cdot \log Ei - NCi] + Ki2 \cdot (\log Ei - \log \hat{E}i) \tag{12}$$

A copying apparatus with an adjusting unit according to one of FIGS. 3-6 permits the manufacturer to achieve a distinctly separated analysis of corrections using a simple computer system since the individual adjusting functions are independent of one another. For the user of the apparatus, the adjustment procedure is simpler because the user can orient herself or himself employing measurements obtained from a test image. Thus, when a test copy is made from a set of signals which are stored in the memory 7 and serve as a calibrating original, it is possible, by way of example, for a particular copy material, to assign specific adjustment values KGi and UCi, or UGi and KCi, to each densitometric value obtained from the test copy. This may be accomplished by presetting the Look-Up-Table 8 for the gloss of the copy material; presetting the color matrixing unit 9 in accordance with the manufacturer's specifications for the material; and presetting the Look-Up-Table 13,13',13" for the characteristic function of the cathode ray tube 14 based on measurements obtained therefrom.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of copying an original in which an imaging device makes an optical image of said original and said image is printed, comprising the steps of scanning said original; generating imaging signals based on the scanning step; adjusting at least one of a plurality of exposure parameters for the printing of said image in such a manner that each remaining exposure parameter of said plurality is substantially unaffected, the adjusting step including modifying said signals so that the latter are substantially proportional to a predetermined characteristic of said device or to the logarithm of said predetermined characteristic, and correcting said signals subsequent to modification, said correcting compromising multiplying said signals by a correction factor for said at least one exposure parameter or adding a correction factor for said at least one exposure parameter to said signals; and converting said signals into said image after the adjusting step by means of said imaging device.

2. The method of claim 1, wherein said plurality of exposure parameters includes gray balance and contrast.

3. The method of claim 1, wherein the scanning and converting steps are performed point-by-point.

4. The method of claim 1, further comprising the step of processing said signals prior to the adjusting step to enhance said image.

5. The method of claim 1, wherein said device comprises a cathode ray tube.

6. The method of claim 1, wherein said device includes a source of illumination having an illumination intensity and said predetermined characteristic is said illumination intensity.

7. The method of claim 1, wherein said original is colored and the scanning step is performed in each of the three primary colors red, green and blue so as to generate three series of imaging signals each of which corresponds to a different primary color, said correcting comprising multiplying the signals of each series by a correction factor for the respective primary color or adding a correction factor for the respective primary color to the signals of each series.

8. The method of claim 7, wherein the converting step comprises printing said image on color copy material.

9. The method of claim 8, said copy material being designed to more strongly absorb radiation in three primary absorption ranges and to more weakly absorb radiation outside of said ranges; and further comprising the step of processing said signals to compensate for the radiation absorption of said copy material outside of said ranges, said compensation for radiation absorption outside of said ranges being performed prior to the adjusting step.

10. The method of claim 9, said device having a non-linear characteristic function; and further comprising the step of processing said signals to compensate for the non-linearity of said characteristic function, said compensation for non-linearity being performed after the adjusting step.

11. The method of claim 10, wherein said modifying is performed using a look-up-table.

12. The method of claim 7, said at least one exposure parameter being the contrast of said image, and said signals being modified so as to be substantially proportional to said predetermined characteristic; and wherein said correcting comprises adding a respective contrast correction factor to the signals of each series, generating a respective contrast compensating factor for each of said series from said correction factors, and multiplying the sums of the signals and the corresponding contrast correction factors by the respective contrast compensating factors.

13. The method of claim 7, said at least one exposure parameter being the contrast of said image, and said signals being modified so as to be substantially proportional to the logarithm of said predetermined characteristic; and wherein said correcting comprises multiplying the signals of each series by a respective contrast correction factor, generating a respective contrast compensating factor for each of said series from said correction factors, and adding the respective contrast compensating factors to the products of the signals and the corresponding contrast correction factors.

14. A copying apparatus, comprising means for scanning an original and generating imaging signals; means for converting the imaging signals into an optical image and printing the image; and means between said scanning means and said converting means for adjusting at least one exposure parameter for the printing of the image, said adjusting means including a first unit for modifying the imaging signals so as to be substantially proportional to a predetermined characteristic of said converting means or to the logarithm of said predetermined characteristic, and a second unit for correcting the signals subsequent to modification by adding a correction factor for said at least one exposure parameter to the signals or multiplying the signals by a correction factor for said at least one exposure parameter.

15. The apparatus of claim 14, wherein said converting means comprises a cathode ray tube.

16. The apparatus of claim 14, wherein said scanning means is designed to scan the original and generate imaging signals point-by-point, said converting means being designed to convert the imaging signals into the optical image point-by-point.

17. The apparatus of claim 14, wherein the original and the image are colored and said converting means is designed to form the image on color copy material, said adjusting means being designed to adjust the signals to the characteristics of the copy material.

18. The apparatus of claim 17, wherein the copy material is designed to more strongly absorb radiation in three primary absorption ranges and to more weakly absorb radiation outside of said ranges; and further comprising color matrixing means between said scanning means and said adjusting means to compensate for the radiation absorption of the copy material outside of said ranges.

19. The apparatus of claim 14, further comprising means between said scanning means and said adjusting means for processing the signals so as to enhance the image.

20. The apparatus of claim 14, said converting means having a characteristic function; and further comprising means between said adjusting means and said converting means for fitting the signals to said characteristic function.

21. The apparatus of claim 14, wherein said first unit comprises a look-up table.

22. The apparatus of claim 14, wherein said converting means comprises a source of illumination having an illumination intensity and said predetermined characteristic is said illumination intensity.

23. The apparatus of claim 14, wherein the original is colored and said scanning means is designed to scan the original in each of the three primary colors red, green and blue and to generate three series of imaging signals each of which corresponds to a different primary color, said second unit being designed to add a correction factor for the respective primary color to the signals of each series or to multiply the signals of each series by a correction factor for the respective primary color.

24. The apparatus of claim 23, said at least one exposure parameter being the gray balance of the image, and said first unit being designed to modify the signals so as to be substantially proportional to said predetermined characteristic; and wherein said second unit comprises a multiplying device having a pair of inputs, and a multiplexer designed to receive gray balance correction factors for the different primary colors, said first unit being connected to one of said inputs and said multiplexer being connected to the other of said inputs.

25. The apparatus of claim 23, said one exposure parameter being the gray balance of the image, and said first unit being designed to modify the signals so as to be substantially proportional to the logarithm of said predetermined characteristic; and wherein said second unit comprises a summing device having a pair of inputs, and a multiplexer designed to receive gray balance correction factors for the different primary colors, said first unit being connected to one of said inputs and said multiplexer being connected to the other of said inputs.

26. The apparatus of claim 23, said one exposure parameter being the contrast of the image, and said first unit being designed to modify the signals so as to be substantially proportional to said predetermined characteristic; and wherein said second unit comprises a summing device having a pair of inputs, and a multiplexer designed to receive contrast correction factors for the different primary colors, said first unit being connected to one of said inputs and said multiplexer being connected to the other of said inputs.

27. The apparatus of claim 26, wherein said second unit further comprises a multiplying device having a pair of second inputs, a device for deriving contrast compensating factors for the different primary colors from the contrast correction factors, and a second multiplexer arranged to receive the compensating factors, said summing device being connected to one of said second inputs and said second multiplexer being connected to the other of said second inputs.

28. The apparatus of claim 27, said adjusting means being designed to additionally adjust the gray balance of the image; and wherein said second unit additionally comprises a second multiplying device having a pair of third inputs, and a third multiplexer designed to receive gray balance correction factors for the different primary colors, the first of said multiplying devices being connected to one of said third inputs and said third multiplexer being connected to the other of said third inputs.

29. The apparatus of claim 23, said one exposure parameter being the contrast of the image, and said first unit being designed to modify the signals so as to be substantially proportional to the logarithm of said predetermined characteristic; and wherein said second unit comprises a multiplying device having a pair of inputs, and a multiplexer designed to receive contrast correction factors for the different primary colors, said first unit being connected to one of said inputs and said multiplexer being connected to the other of said inputs.

30. The apparatus of claim 29, wherein said second unit further comprises a summing device having a pair of second inputs, a device for deriving contrast compensating factors for the different primary colors from the contrast correction factors, and a second multiplexer designed to receive the compensating factors, said multiplying device being connected to one of said second inputs and said second multiplexer being connected to the other of said second inputs.

31. The apparatus of claim 30, said adjusting means being designed to additionally adjust the gray balance of the image; and wherein said second unit additionally comprises a second summing device having a pair of third inputs, and a third multiplexer designed to receive gray balance correction factors for the different primary colors, the first of said-summing devices being connected to one of said third inputs and said third multiplexer being connected to the other of said third inputs.

* * * * *